(No Model.)  5 Sheets—Sheet 1.
D. JENKINS.
PLANING MACHINE.

No. 526,903. Patented Oct. 2, 1894.

Witnesses
Geo. W. Young.
John E. Wiles.

Inventor
David Jenkins.
By H. G. Underwood
Attorney (No Model.) 5 Sheets—Sheet 3.

D. JENKINS.
PLANING MACHINE.

No. 526,903. Patented Oct. 2, 1894.

Witnesses
Geo. W. Young.
John E. Wiles.

Inventor
David Jenkins,
By H. G. Underwood
Attorney (No Model.)  5 Sheets—Sheet 4.
D. JENKINS.
PLANING MACHINE.
No. 526,903.  Patented Oct. 2, 1894.
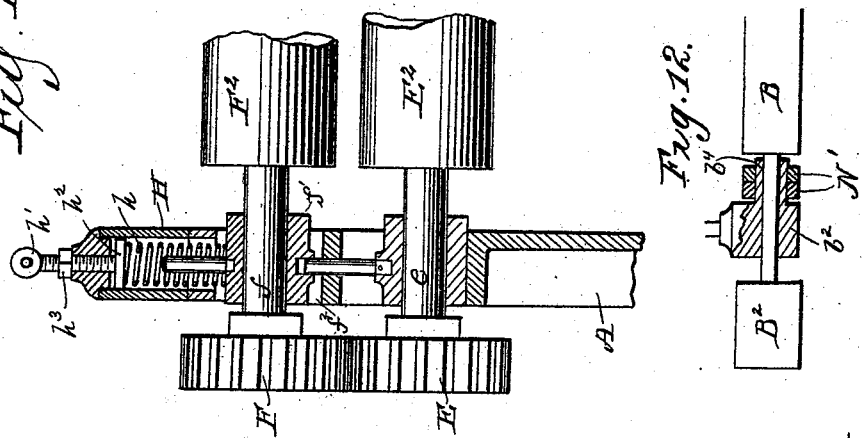
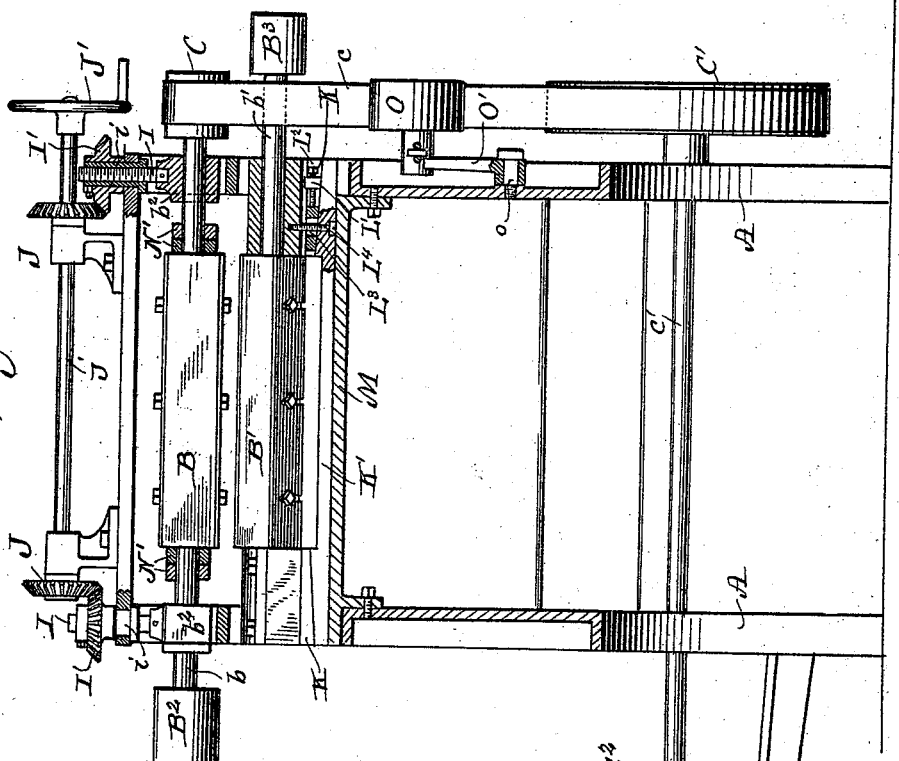
Witnesses
Geo. W. Young
John E. Miles
Inventor
D. Jenkins
By H. G. Underwood
C. W. Vorwerg (No Model.)
D. JENKINS.
PLANING MACHINE.
No. 526,903.
5 Sheets—Sheet 5.
Patented Oct. 2, 1894.
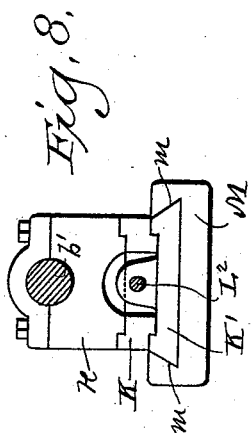
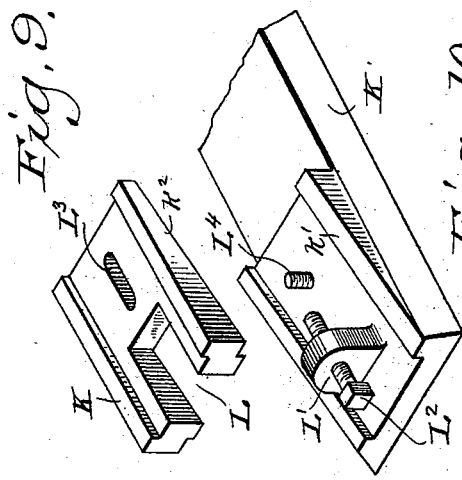
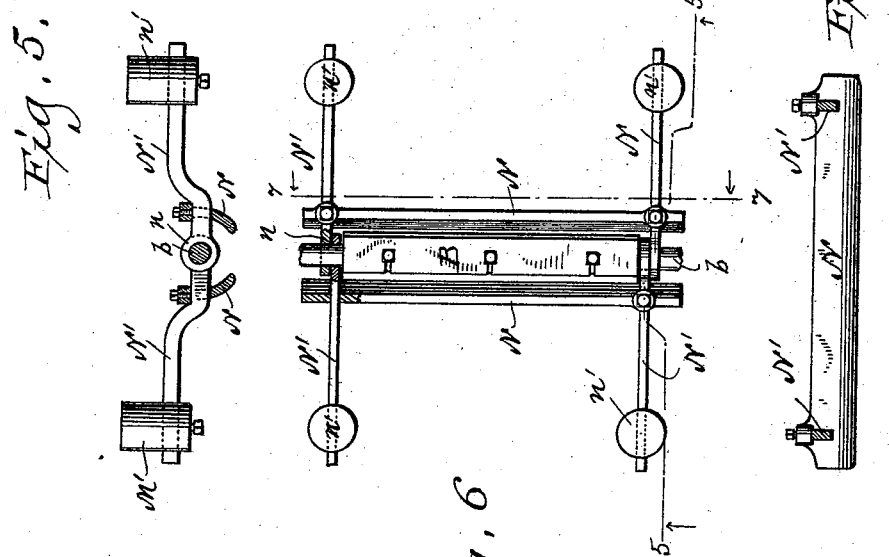
Witnesses
Geo. W. Young.
John E. Wiler.
Inventor
David Jenkins,
By H. G. Underwood.
Attorney

UNITED STATES PATENT OFFICE.

DAVID JENKINS, OF SHEBOYGAN, WISCONSIN, ASSIGNOR TO THE JENKINS MACHINE COMPANY, OF SAME PLACE.

PLANING-MACHINE.

SPECIFICATION forming part of Letters Patent No. 526,903, dated October 2, 1894.

Application filed August 15, 1892. Serial No. 443,084. (No model.)

*To all whom it may concern:*

Be it known that I, DAVID JENKINS, a citizen of the United States, and a resident of Sheboygan, in the county of Sheboygan and State of Wisconsin, have invented certain new and useful Improvements in Planing-Machines; and I do hereby declare that the following is a full, clear, and exact description thereof.

My invention relates to machines for planing the surfaces of curved pieces of wood, and consists in the matters hereinafter described and pointed out in the appended claims.

Figure 1:
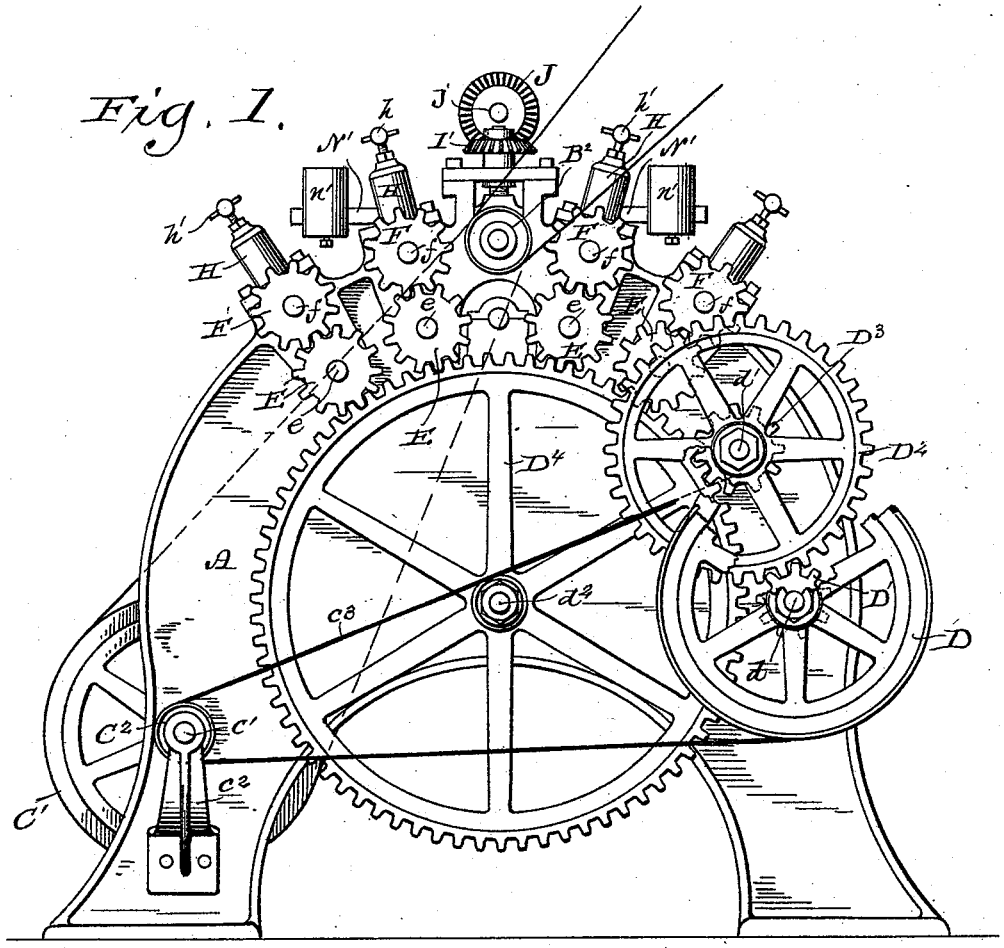
Figure 2:
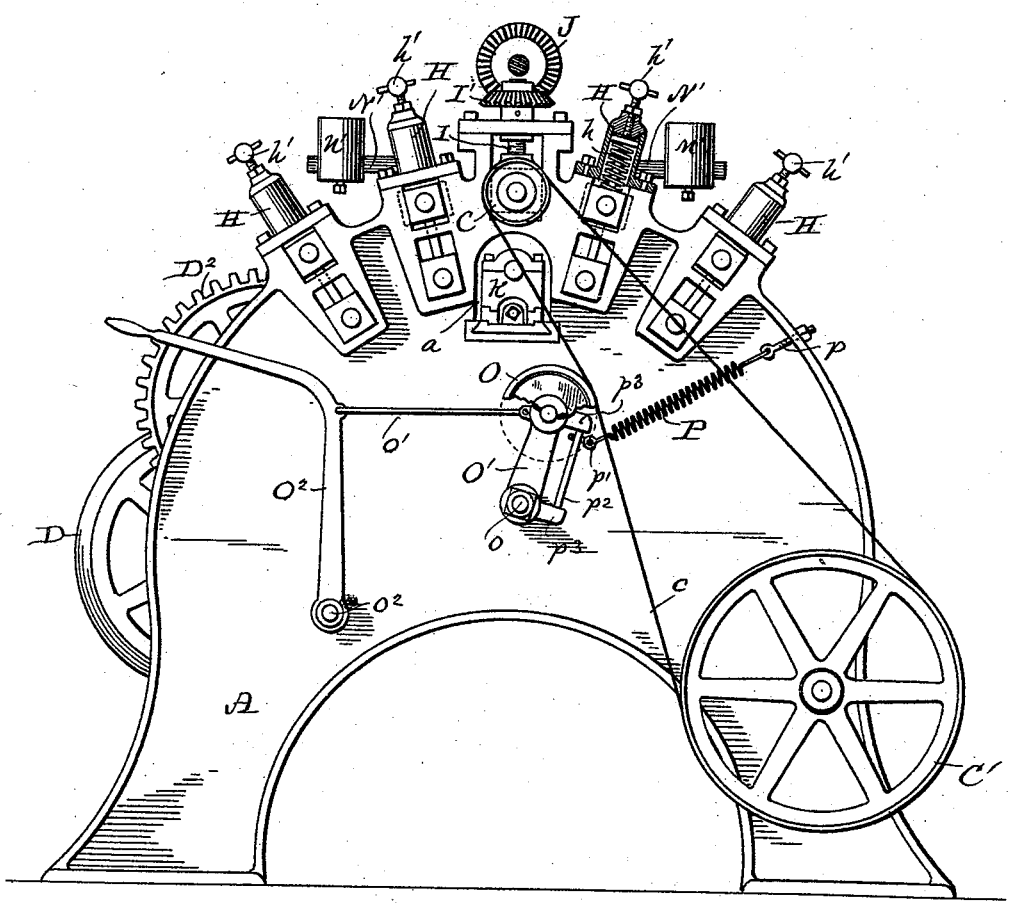
Figure 3:
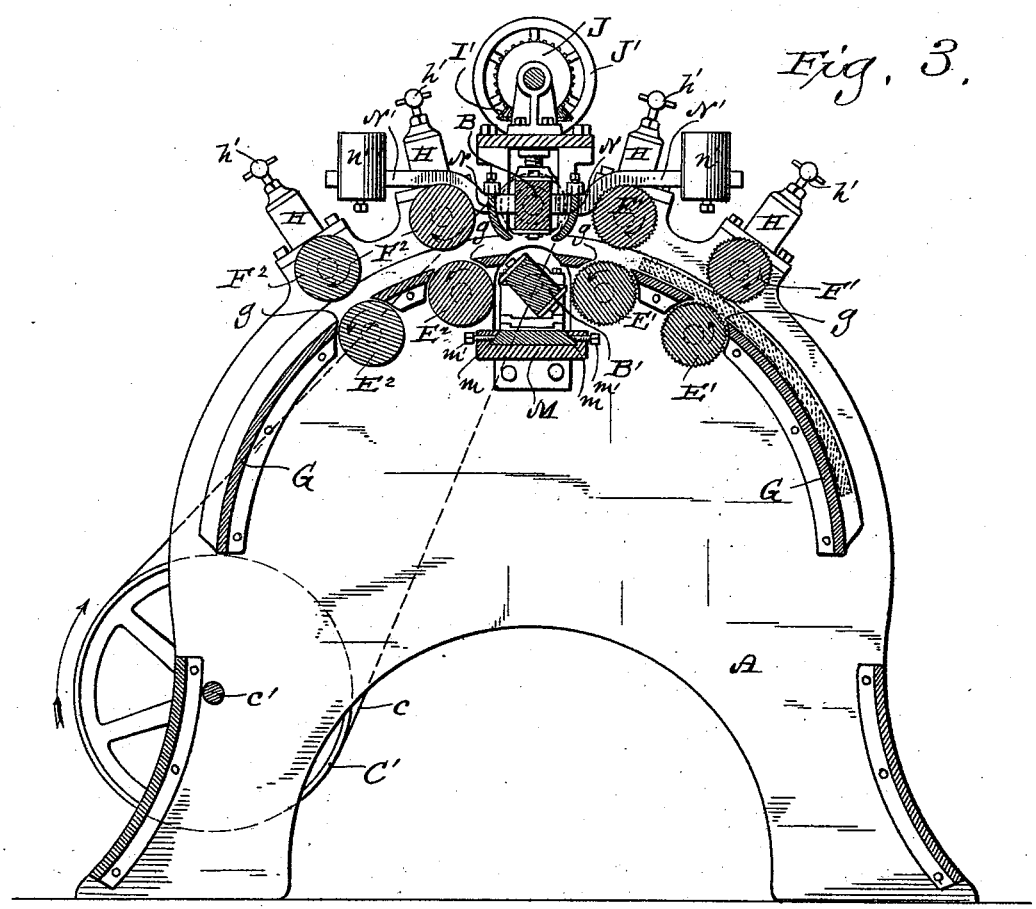

In the accompanying drawings illustrating my invention: Figure 1 is a side elevation of a machine constructed in accordance with my invention. Fig. 2 is a similar view of the opposite side of the machine. Fig. 3 is a central vertical sectional view of the same. Fig. 4 is a vertical cross sectional view taken on line 4—4 of Fig. 2. Fig. 5 is a detail sectional view of the pressure mechanism taken on line 5—5 of Fig. 6. Fig. 6 is a top plan view of the same with portions broken away to show the manner of attaching said mechanism to the arbor of the cutter head. Fig. 7 is a cross sectional view of the same taken on line 7—7 of Fig. 6. Fig. 8 is an end elevation of one of the bearings for the lower cutter head and illustrates the means for vertically adjusting the same. Fig. 9 is a detail perspective view of the wedge employed for this purpose. Fig. 10 is a perspective view of one end of the support for the bearings for said lower cutter. Fig. 11 is a detail sectional view illustrating the construction of the bearings for the pressure and feeding rollers. Fig. 12 is a detail view illustrating a different form of connection between the pressure arms and the cutter head arbor.

In said drawings:—A represents a suitable frame and B and B' respectively the upper and lower cutter heads the arbors $b$ and $b'$ of which are revolubly supported in suitable bearings secured to the frame A, as will be presently described in detail.

Upon one end of the arbor $b$ of the upper cutter head B, is provided a drive pulley $B^2$, to which rotary motion is communicated from any suitable drive pulley by means of a belt in the ordinary manner. Upon the other end of the arbor $b$ is secured a second pulley C and a belt $c$ is trained over said pulley C, and a larger pulley C' upon the end of a shaft $c'$ which is journaled in the frame A. The shaft $c'$ extends through the frame from side to side of the machine and projects beyond said frame at the end opposite to pulley C', and has a bearing in a bracket $c^2$ extending from the side of frame A.

A pulley $C^2$ is secured to the shaft $c'$ between its bearings in the frame A and the bracket $c^2$, and a belt $c^3$ transmits motion from said pulley $C^2$ to a pulley D journaled upon a stud shaft $d$ extending from the side of the frame A. Upon the hub of the pulley D is secured a pinion D' which meshes with the teeth of a gear wheel $D^2$ which is likewise mounted on a stud shaft $d'$ extending from the side of the frame A and upon the hub of which gear is secured a pinion $D^3$. Meshing with this latter pinion is a gear wheel $D^4$ revolubly mounted upon a stud shaft $d^2$ which also projects from the frame of the machine.

Any desired number of pinions E E mesh with the teeth of the gear wheel $D^4$ said pinions being secured to the axes $e$ $e$ of a series of feeding and delivery rollers E' E' and $E^2$ $E^2$ respectively, the former which are located at the feed end of the machine being preferably roughened or corrugated as shown more particularly in Fig. 3.

A corresponding number of pinions F F are secured to the axes $f f$ of a series of feeding and delivery rollers F' F' and $F^2$ $F^2$ respectively which are similar in construction to the rollers E' E' and $E^2$ $E^2$ and arranged in opposition thereto. A curved bed plate G is secured between the two sides of the frame A, and the axes $e$ $e$ and $f f$ of the two series of rollers are located respectively below and above the bed plate G, said plate being cut away as at $g$ $g$ for the reception of the lower series of said rollers, which project upwardly therethrough sufficiently to engage with the under surface of the curved pieces to be planed.

Upon one end of the arbor $b$ of the lower cutter, is secured a pulley $B^3$ by means of which said lower cutter may be actuated.

It follows from the construction described, that rotary motion being communicated to the upper cutter is transmitted by means of pulley C, belt c and pulley C', to shaft c' which carries the pulley C², this motion being transmitted by belt c³ to pulley D and pinion D', from pinion D' to gear D² and pinion D³, and by pinion D³ to gear D⁴, which drives all of the pinions E E and the rollers connected therewith, while said pinions E E, meshing with the pinions F F cause said latter pinions to revolve in a direction opposite to the pinions E. The upper and lower series of rollers are thus given rotary motion in opposite directions and at uniform speed, so as to enable them to engage with the upper and lower surfaces of the work and to produce a uniform feed of the same between the two cutter heads.

As illustrated in Figs. 1, 2, 3, 4 and 11, of the drawings, the upper rollers F' F' and F² F² are movably supported in the frame the axes $f\ f$ of said rollers being journaled in boxes $f'\ f'$ which are movably supported in slots $f^2\ f^2$ in said frame. Above each one of these boxes $f'$ is arranged a housing H, within which is provided a spiral spring $h$ which bears upon the top of the adjacent box $f'$. An adjusting screw $h'$ is threaded through the upper end of each of said housings and carries upon its lower end a follower $h^2$ arranged to bear upon the upper end of the spring $h$, and a set nut $h^3$ is preferably arranged upon the adjusting screw $h'$ to secure it in its adjusted position. It follows from this construction that the upper set of rollers will be pressed downward into engagement with the work by the springs, and will be permitted to yield upwardly as may be necessary, while by the arrangement of the adjusting devices before described, the pressure of the springs $h\ h$ may be regulated as desired.

I also prefer to make the upper cutter head adjustable with respect to the lower cutter head, and for this purpose, I journal the arbor $b$ of said cutter head in vertically movable boxes $b^2\ b^2$ which are engaged with suitable ways in the frame A. Extending upwardly from the upper sides of the boxes $b^2$ $b^2$ are screw threaded studs I I and arranged above said boxes and revolubly supported upon the frame are bevel gears I' I' each of which has its hub in the form of a screw threaded sleeve $i$ which engages with one of the studs I, the latter being fast to the aforesaid boxes.

Bevel gears J J are secured upon a transverse shaft $j$ suitably journaled upon the machine frame and mesh with the gears I I, and upon one end of this shaft is provided an operating hand wheel J' by means of which said shaft $j$ and gears J J may be rotated. By the rotation of said hand wheel, the gears J J will be actuated to rotate the two gears I' I', so as to cause the screw threaded studs I I to be raised or lowered by reason of their engagement with the nuts $i\ i$, so as to effect a uniform vertical adjustment of both ends of the arbor of the upper cutter head. I also find it desirable to provide means for effecting a vertical adjustment of the lower cutter head, and for this purpose, I provide wedge shaped blocks K K between the lower surfaces of the boxes $k\ k$ and their horizontal supporting plate K', which may be adjusted longitudinally to effect a vertical adjustment of one or both ends of the lower cutter head.

The opposite ends of the supporting plate K' are conveniently provided with inclined faces $k'\ k'$ adapted for engagement with correspondingly inclined faces $k^2\ k^2$ of the wedge blocks K K, and the outer ends of said blocks are each preferably cut away as at L for the reception of an upwardly extending lug L' upon the supporting plate K', a set screw L² being passed through said lug and arranged to engage with the block as in Fig. 4. A slot L³ is provided in each wedge block K and a locking bolt L⁴ is passed upward through the plate K' and through said slot and threaded into the under side of box $k$. It follows from this construction, that in order to adjust the end of the arbor of the lower cutter, it is only necessary to loosen the box by unscrewing the locking bolt L⁴, and then by the operation of the adjusting bolt L², adjust the wedge block lengthwise beneath the box $k$, when the locking bolt L⁴ may be again tightened to hold the parts firmly together. Thus either end of the lower cutter may be adjusted as may be desired, or both ends may be adjusted and the said cutter raised or lowered bodily.

I furthermore prefer to make the lower cutter removable and for this purpose, I provide a transverse plate M, extending from side to side of the machine frame, and provided upon its upper side with a dove-tail channel $m$; and the lower side of the plate K' is shaped to correspond with the dove-tail channel $m$ and is slidingly engaged therewith as shown in Figs. 2, 3, and 8, more particularly.

As also shown in Figs. 1, 2 and 3, the sides A A of the frame are cut away as at $a\ a$ to permit the support K' with the lower cutter to be withdrawn bodily when desired. When the lower cutter is in position and it is desired to secure it there, set screws $m'\ m'$, which are threaded through the side walls of the plate M, are adjusted so as to securely bind the plate K' in its adjusted position in the channel $m$, as shown more particularly in Fig. 3. As a further improvement, I provide transverse pressure bars, N N upon opposite sides of the upper cutter head, these bars being conveniently secured to arms N' N' which are pivotally engaged at their inner ends, with the arbor $b$ of the upper cutter, as shown at $n\ n$. Adjustable weights $n'\ n'$ are provided upon the free ends of the arms and serve to regulate the downward pressure of the bars N N in an obvious manner.

As illustrated more particularly in Figs. 3, 5 and 6, I prefer to construct the bars N N so as to lie close to the cutter head B, and with inwardly curved lower edges, so as to cause said pressure bars to engage with the upper surface of the work close to the point where the cutter operates thereon.

By the construction of the upper and lower cutters to be actuated independently, as described they may be both operated at one time to finish both surfaces of the work simultaneously, or, if desired, the lower cutter may remain idle, or may be entirely removed and the upper cutter alone operated.

As shown in Fig. 2, I prefer to provide a belt tightener for engagement with the belt $c$ which leads from the pulley C to the pulley C' and I find it convenient to construct said tightener as shown in said figure, in which a pulley O is journaled at the free end of an arm O' which is pivoted at $o$ to the frame. A spring P is engaged at $p$ with the frame A and at its other end is provided with an eye $p'$ which has a sliding engagement with a rod $p^2$ which extends between lateral projections $p^3$ $p^3$ at opposite ends of arms O'. A link $o'$ connects the free end of the arm O' with an arm or lever O² pivoted to the frame A at $o^2$. When the parts are in the relative positions shown in Fig. 2, the spring P operates to draw the pulley O against the belt $c$ so as to cause it to rotate pulley C' and the gearing driven thereby, but when it is desired to stop the said gearing, the operator has only to throw the lever O² to the left, so as to cause arm O' to swing pulley O out of engagement with the belt. By the time the arm O' has swung to a considerable angle to the left of the perpendicular, the tension of spring P will cause the eye $p'$ to slip upon rod $p^2$ until it reaches the projection $p^3$ adjacent to the pivotal connection $o$ of said arm with the frame, when the spring will not have a tendency to draw the tightener back into engagement with the belt.

Instead of pivoting the pressure arms N' N' directly upon the arbor $b$ of the upper outer head B, I may, if desired, arrange said arms so as to pivotally engage at their inner ends, with tubular extensions $b^4$ $b^4$ upon the inner ends of the boxes $b^2$ $b^2$ for said arbor, as shown in Fig. 12 of the drawings, so as to prevent any tendency toward unequal pressure of said arms due to rapid rotation of said cutter head and arbor.

Having thus described my invention, what I claim as new, and desire to secure by Letters Patent of the United States, is—

1. In a machine for planing curved pieces of wood, the combination with a suitable frame, of an arc shaped bed plate, cutters journaled above and below said bed plate, a gear mounted on a stud shaft at one side of the machine frame and concentric with said bed, feeding rollers arranged in pairs above and below the bed, pinions upon the axes of the lower rollers arranged to mesh with the teeth of said gear, similar pinions upon the axes of the upper rollers meshing with the first mentioned pinions, and means for imparting rotary motion to said gear, substantially as set forth.

2. A machine for planing curved pieces of wood, comprising a suitable frame provided with an arc shaped bed plate, a revoluble cutter head journaled above the central part of said bed plate, an actuating pulley upon one end of the arbor of said cutter head, a pulley upon the other end of said arbor, a second pulley secured to a shaft journaled upon the machine frame, an idler gear journaled upon a stud shaft concentric with said bed plate, a train of gears for transmitting rotary motion from said shaft to said idler gear, a plurality of pinions secured to the ends of transverse shafts and meshing with said idler gear, feeding rollers carried by said shafts and adapted to engage with the lower surface of the curved pieces of wood, and a second series of pinions meshing with the first mentioned pinions and secured to the ends of shafts journaled in upwardly yielding boxes and carrying rollers arranged to engage with the upper surface of said curved pieces, substantially as set forth.

3. In a planing-machine, the combination of the frame, an arm pivoted thereto and provided with lateral projections, a rod connecting the projections a spring fast at one end to said frame and having its other end loose on the rod, a lever linked to the arm, a pulley journaled in said arm, and a driving belt opposed to the pulley, substantially as set forth.

4. In a machine for planing curved pieces of wood, the combination with a suitable frame, of an arc-shaped bed-plate, a suitably arranged cutter-head, a gear mounted on a stud at one side of the machine concentric with said bed, feed rollers arranged in pairs above and below the bed, pinions connected to the lower feed rolls and in mesh with the teeth of said gear, other pinions connected to the upper feed-rolls to mesh with the former pinions, and means for imparting rotary motion to the aforesaid gear, substantially as set forth.

In testimony that I claim the foregoing I have hereunto set my hand, at Sheboygan, in the county of Sheboygan and State of Wisconsin, in the presence of two witnesses.

DAVID JENKINS.

Witnesses:
W. W. WOLFF,
M. A. LONG.